United States Patent [19]
Osawa et al.

[11] Patent Number: 5,912,063
[45] Date of Patent: Jun. 15, 1999

[54] BIAXIALLY ORIENTED LAMINATE FILMS AND MAGNETIC RECORDING MEDIA

[75] Inventors: Toshifumi Osawa; Makoto Handa; Mitsuio Tojo; Hideaki Watanabe, all of Sagamihara, Japan

[73] Assignee: Teijin Limited, Osaka, Japan

[21] Appl. No.: 08/794,646

[22] Filed: Feb. 3, 1997

[30] Foreign Application Priority Data

| Feb. 5, 1996 | [JP] | Japan | 8-018694 |
| Feb. 19, 1996 | [JP] | Japan | 8-030425 |
| Feb. 22, 1996 | [JP] | Japan | 8-034699 |
| May 24, 1996 | [JP] | Japan | 8-129866 |

[51] Int. Cl.$^6$ ................................... G11B 5/704
[52] U.S. Cl. .................. 428/141; 428/212; 428/213; 428/457; 428/480; 428/482; 428/483; 428/694 TR; 428/694 BR; 428/694 ST; 428/694 SL; 428/694 SG; 428/900
[58] Field of Search .............. 428/457, 480, 428/482, 483, 694 TR, 694 BR, 694 ST, 694 SL, 694 SG, 900, 141, 212, 213

[56] References Cited

U.S. PATENT DOCUMENTS

| 4,615,939 | 10/1986 | Corsi et al. | 428/323 |
| 4,828,918 | 5/1989 | Miquel et al. | 428/333 |
| 5,270,096 | 12/1993 | Kato et al. | 428/143 |
| 5,328,745 | 7/1994 | Kurihara et al. | 428/141 |
| 5,336,079 | 8/1994 | Okazaki et al. | 428/323 |
| 5,374,467 | 12/1994 | Sato | 428/143 |
| 5,401,559 | 3/1995 | Okamoto et al. | 428/143 |
| 5,419,924 | 5/1995 | Masuda et al. | 428/141 |
| 5,670,236 | 9/1997 | Kotani et al. | 428/141 |

FOREIGN PATENT DOCUMENTS

| 0515092 | 11/1992 | European Pat. Off. | B32B 3/26 |
| 0663286 | 7/1995 | European Pat. Off. | B32B 27/36 |
| 2548958 | 1/1985 | France | B32B 3/30 |
| 52-134706 | 11/1977 | Japan . | |
| 54-147010 | 11/1979 | Japan . | |
| A58-68223 | 4/1983 | Japan . | |
| 60-180837 | 9/1985 | Japan . | |
| 60-180838 | 9/1985 | Japan . | |
| 60-180839 | 9/1985 | Japan . | |
| 56-16937 | 2/1987 | Japan . | |
| A22-14657 | 8/1990 | Japan . | |
| 373409 | 3/1991 | Japan . | |
| B380410 | 12/1991 | Japan . | |
| 5194772 | 8/1993 | Japan . | |
| 5210833 | 8/1993 | Japan . | |
| B780282 | 8/1995 | Japan . | |
| WO 9413463 | 6/1994 | WIPO | B32B 3/10 |

OTHER PUBLICATIONS

Technical Report MR 93–78 (Feb. 1995).

*Primary Examiner*—Stevan A. Resan
*Attorney, Agent, or Firm*—Sughrue, Mion, Zinn, Macpeak & Seas, PLLC

[57] ABSTRACT

A biaxially oriented laminate film comprising a thermoplastic resin layer A and a thermoplastic resin layer B which is laminated on one side of the thermoplastic resin layer A. The surface of the thermoplastic resin layer A has protrusions having an average height of 2 to 85 nm and an average width of 20 to 500 $\mu$m, at a density of 4 to 2,500/mm$^2$. The thermoplastic resin layer B contains inert fine particles, and the surface of the thermoplastic resin layer B is rougher than the surface of the thermoplastic resin layer A. The laminate film can have furher a layer C on the thermoplastic resin layer A. The surface of the thermoplastic resin layer C has protrusions having an average height of 2 to 85 nm and an average width of 20 to 500 $\mu$m, at a density of 4 to 2,500/mm$^2$. These laminate film are useful as a base film for magnetic recording medium.

37 Claims, No Drawings

BIAXIALLY ORIENTED LAMINATE FILMS AND MAGNETIC RECORDING MEDIA

DETAILED DESCRIPTION OF THE INVENTION

This invention relates to biaxially oriented laminate films and magnetic recording media comprising the same as a base film. More specifically, it relates to biaxially oriented laminate films which have excellent wind-up property, non-defect property, slipperiness and handling property and is useful as a base film for a high-density magnetic recording medium which is excellent in electromagnetic conversion characteristics, drop-out and running property and durability; and magnetic recording media comprising the same as a base film.

In recent years, remarkable progress has been made in high-density magnetic recording, as exemplified by the development and implementation of a thin ferromagnetic metal film magnetic recording medium in which a thin ferromagnetic metal film is formed on a non-magnetic base film by vacuum deposition or a physical deposition method such as sputtering or a plating method, and a thin layer coated magnetic recording medium in which a needle-like magnetic powder such as a metal powder or iron oxide powder is coated to a thickness of not larger than 2 $\mu$m.

Examples of the former include a Co-deposited tape (refer to Japanese Laid-open Patent Application No. Sho 54-147010) and a vertical magnetic recording medium formed from a Co-Cr alloy (refer to Japanese Laid-open Patent Application No. Sho 52-134706), whereas examples of the latter include an extremely thin layer coated medium for high-density magnetic recording (refer to "Technical Report MR 93-78" issued by the Institute of Electronics and Communication Engineers of Japan (1995-02)).

Since a coated magnetic recording medium of the prior art, i.e., a magnetic recording medium in which a mixture of magnetic powders and an organic polymer binder is coated on a non-magnetic base film is low in recording density and has a long recording wavelength, the thickness of its magnetic layer is as thick as about 2 $\mu$m or more. On the other hand, a thin metal film formed by thin film forming means such as vapor deposition, sputtering or ion plating has an extremely small thickness of 0.2 $\mu$m or less. In the case of the extremely thin-layer coat type medium, too, a coated magnetic layer as thin as 0.13 $\mu$m has been proposed though it is provided with a non-magnetic underlying layer.

Therefore, in the above high-density magnetic recording medium, the surface condition of the non-magnetic base film has a great influence on the surface characteristics of the magnetic recording layer. Particularly in the case of a thin metal film magnetic recording medium, the surface condition of the non-magnetic base film appears directly as an uneven surface of a magnetic recording layer, thereby causing noise in recording and reproduction signals. Therefore, it is desirable that the surface of the non-magnetic base film be as smooth as possible.

On the other hand, from a view point of the formation of a non-magnetic base film and handling properties such as transportation, scratching, wind-up and unwinding in the film formation process, the film having too smooth film surface is not desirable because slipperiness between films deteriorates, a blocking phenomenon occurs, roll formation of the base film becomes inferior and consequently, the yield of products lowers, thereby inducing an increase in production costs. Therefore, from a view point of production costs, it is desirable that the surface of the non-magnetic base film be as rough as possible.

As described above, the surface of the non-magnetic base film is required to be smooth from a view point of electromagnetic conversion characteristics, whereas it is required to be rough from a view point of handling properties and film costs.

Further, in the case of a thin deposited metal film type magnetic recording medium, the serious problem encountered when it is actually used is the insufficient running property of the surface of a thin metal film. In the case of a coat type magnetic recording medium in which a magnetic powder is mixed into an organic polymer binder and the resulting mixture is coated on a base film, the running property of the magnetic surface can be improved by dispersing a lubricant in the binder. However, in the case of a thin metal film type magnetic recording medium, such measure cannot be taken, and it is extremely difficult to maintain stable running property. The running property is bad under high-temperature and high-humidity conditions in particular.

To supply an inexpensive high-quality base film for a high-density recording medium, therefore, it is necessary to satisfy the above two contradictory requirements at the same time.

As means for realizing this, there have been proposed (1) a method for forming a discontinuous film by coating a particular coating on the surface of a film (refer to Japanese Patent Publication No. Hei 3-80410, Japanese Laid-open Patent Applications Nos. Sho 60-180839, Sho 60-180838, Sho 60-180837, Sho 56-16937 and Sho 58-68223), (2) a method for forming a continuous film having a fine uneven surface (refer to Japanese Laid-open Patent Applications Nos. Hei 5-194772 and Hei 5-210833), (3) a method for forming different front and back surfaces by such a technology as coextrusion (refer to Japanese Laid-open Patent Application No. Hei 2-214657 and Japanese Patent Publication No. Hei 7-80282), and (4) a method which combines the above methods (1) and (3) or (2) and (3) (refer to Japanese Laid-open Patent Application No. Hei 3-73409).

However, although the methods for forming an discontinuous film or a continuous film having a fine uneven surface can solve such problems as slipperiness between films and blocking, there still remain unsatisfactory in respect of base film formation and handling properties such as transportation, scratching, wind-up and unwinding in the film formation process. Thus, they have problems to be solved for their application to a base film for a high-density large-capacity magnetic recording medium from view points of the yield and costs of products. In addition, the co-extrusion technology of the prior art and a technology for combining a discontinuous film or a continuous film with the coextrusion technology involve the same problems. Further, a thin metal film type magnetic recording medium still has a problem with running property under high-temperature and high-humidity conditions.

It is therefore, an object of the present invention to provide biaxially oriented laminate films which overcome the defects of the prior art and are excellent in transportability, scratch resistance and wind-up property in the process of film formation.

It is another object of the present invention to provide inexpensive high-density magnetic recording media which exhibit the above excellent characteristics and are excellent in running property under high-temperature and high-humidity conditions when they are used as a thin metal film type magnetic recording medium, for example.

The above and other objects and advantages of the present invention will become apparent from the following description.

According to the present invention, firstly, the above objects and advantages of the present invention can be attained by a biaxially oriented laminate film (may be referred to as "first laminate film of the present invention" hereinafter) which comprises a thermoplastic resin layer A and a thermoplastic resin layer B which is laminated on one side of the thermoplastic resin layer A, wherein the surface not in contact with the thermoplastic resin layer B, of the thermoplastic resin layer A has protrusions having an average height of 2 to 85 nm and an average width of 20 to 500 μm, at a density of 4 to 2,500/mm²; and the thermoplastic resin layer B contains inert fine particles and the surface thereof not in contact with the thermoplastic resin layer A is rougher than the surface not in contact with the thermoplastic resin layer B, of the thermoplastic resin layer A.

The first laminate film of the present invention consists of the thermoplastic resin layer A (sometimes, referred to as "resin layer A" hereinafter) and the thermoplastic resin layer B (sometimes, referred to as "resin layer B" hereinafter) as described above. The resin layer B is laminated on one side of the resin layer A.

The thermoplastic resins A and B may be the same or different resin. The thermoplastic resins are selected from polyester resins, polyamide resins, polyimide resins, polyether resins, polycarbonate resins, polyvinyl resins, polyolefin resins and the like. Of these, polyester resins are preferred and aromatic polyesters are particularly preferred.

The aromatic polyesters are preferably a polyester comprising an aromatic dicarboxylic acid as a main dicarboxylic acid component and an aliphatic diol as a main diol component. Preferred examples of the aromatic dicarboxyic acid include terephthalic acid, isophthalic acid and 2,6-naphthalenedicarboxylic acid and preferred examples of the diol include ethylene glycol, cyclohexane dimethanol and tetramethylene glycol.

The aromatic polyester may be either a homopolyester or a copolyester. In the case of a copolyester, two or more of either of the dicarboxylic acids and diols listed above may be contained as the aromatic dicarboxylic acid and diol components. Alternatively, each one member selected from the dicarboxylic acids and diols listed above and other dicarboxylic acid or diol may be contained.

The other dicarboxylic acid is preferably adipic acid, sebacic acid, phthalic acid or 5-sodium sulfoisophthalic acid. The other diol is preferably diethylene glycol, propylene glycol, hexamethylene glycol, neopentyl glycol, polyethylene glycol or p-xylylene glycol. In addition, oxycarboxylic acid such as p-oxybenzoic acid may be used as a copolymerizable component.

The copolyester preferably contains the main dicarboxylic acid component and the main diol component in a proportion of at least 80 mol % of the total of all dicarboxylic acid components and the total of all diol components, respectively.

The copolyester may further contain a polyfunctional compound having 3 or more functional groups, such as trimellitic acid or pyromellitic acid. In this case, it is recommended that the polyfunctional compound be copolymerized in an amount that the polymer is substantially linear, for example, not more than 2 mol %.

Preferred examples of the aromatic polyester include polyethylene terephthalate, polyethylene isophthalate, polytetramethylene terephthalate, poly-1,4-cyclohexylene dimethylene terephthalate, polyethylene-2,6-naphthalene dicarboxylate, copolyesters which comprise the recurring units of these polyesters as main recurring units (preferably in a proportion of not less than 80 mol % of the total of all the recurring units) and the like. Of these, particularly preferred are polyethylene terephthalate, polyethylene-2,6-naphthalene dicarboxylate and copolyesters which comprise ethylene terephthalate or ethylene-2,6-naphthalene dicarboxylate as a main recurring unit.

In the first laminate film, the surface not in contact with the resin layer A of the resin layer B (to be referred to as "exposed surface of the resin layer B" hereinafter) is rougher than the surface not in contact with the resin layer B of the resin layer A (to be referred to as "exposed surface of the resin layer A" hereinafter).

The exposed surface of the resin layer A has protrusions having an average height of 2 to 85 nm and an average width of 20 to 500 μm at a density of 4 to 2,500/mm². It can be said that the protrusion is a gently-sloped protuberance with an extremely large width for their height, compared with protrusion which is directly produced by the inert fine particles contained in the thermoplastic resin base material.

When the protrusions have an average height of less than 2 nm or an average width of more than 500 μm, the film will be unsatisfactory in terms of transportation in the film formation process, scratch resistance of the film, roll formation, blocking phenomenon between films and further the running property of a tape under high-temperature and high-humidity conditions when the film is used as a base film for a thin metal film type magnetic recording medium.

On the other hand, when the protrusions have an average height of more than 85 nm, the electromagnetic conversion characteristics of the film will deteriorate and the film will not be suitable as a base film for a high-density magnetic recording medium. When the protrusions have an average width of less than 20 μm and an average height of the protrusions of not more than 25 nm, transportability in the film formation process and the running property of a tape will be insufficient.

The average height of the protrusions is preferably 2 to 50 nm, more preferably 2 to 25 nm. The average width of the protrusions is preferably 20 to 300 μm, more preferably 20 to 200 μm. Further, the density of the protrusions is preferably 10 to 2,000/mm², more preferably 10 to 1,000/mm².

The protrusions formed on the exposed surface of the resin layer A may be formed by any known method without restriction, but it is advantageous to form the protrusions by making use of the action of thrusting up the resin layer A, which action is brought about by the inert fine particles in the biaxial orientation process since the resin layer B in contact with the resin layer A contains inert fine particles (to be referred as "inert fine particles B" hereinafter) in the present invention.

To develop this action efficiently, the thickness of the resin layer A and the average particle diameter of the inert fine particles B preferably satisfy the following expression (1):

$$4 \leq t_A/d_B \leq 40 \tag{1}$$

wherein $t_A$ is a thickness (μm) of the thermoplastic resin layer A and $d_B$ is an average particle diameter (μm) of the inert fine particles B.

The above inert fine particles B can be first particles having a particle size distribution of a relative standard deviation of not more than 0.5 or second particles which consist of the first particles, the average particle diameter of the first particles being largest in the second particles, and other particles. In the above expression (1), when the inert fine particles B consist of the first particles alone, $d_B$ is an average particle diameter (μm) of the first particles and when the inert fine particles B consist of the second particles, $d_B$ is the largest average particle diameter ($\mu$m) of the first particles contained in the second particles.

The other particles contained in the second particles can be first particles having a relative standard deviation different from that of the first particles to be combined therewith or other particles not having the same relative standard deviation as that of the first particles and being different from the first particles.

$T_A/d_B$ is preferably in the range of 4 to 25, more preferably 4 to 16, particularly preferably 4 to 8.

The average particle diameter of the first particles or the largest average particle diameter of the first particles contained in the second particles is preferably 0.2 to 1 $\mu$m, more preferably 0.2 to 0.8 $\mu$m, particularly preferably 0.2 to 0.6 $\mu$m. The content of the first particles (including the case where they are contained as part of the second particles) is preferably 0.001 to 5.0 wt %, more preferably 0.005 to 1 wt %, particularly preferably 0.01 to 0.5 wt %.

The above wide protrusions have an extremely large width or period compared with the wavelength (based on the protrusions of less than 1.0 $\mu$m) on the surface of a high-density magnetic recording medium, in particular, and do not have an adverse influence on the electromagnetic conversion characteristics because they have the same or smaller height than protrusions ascribed to the inert fine particles which the resin layer A may contain. The problems of the prior art base film for a high-density magnetic recording medium are all solved by the synergistic effect of the protrusions (if present) ascribed to the inert fine particles contained in the resin layer A, the wide protrusions and the rough surface of the resin layer B.

The resin layer A may contain inert fine particles. When it contains the inert particles, the inert fine particles (to be referred to as "inert fine particles A" hereinafter) preferably have an average particle diameter of 40 to 400 nm and a volume shape factor of 0.1 to $\pi/6$.

When the average particle diameter of the inert ine particles A is less than 40 nm, undesirably, the friction of a magnetic layer against the magnetic head will be large, the repetitive running durability of the magnetic layer will deteriorate, and transportability in the film formation process and scratch resistance will be unsatisfactory. On the other hand, when the average particle diameter is more than 400 nm, the electromagnetic conversion characteristics of a high-density magnetic recording medium comprising the laminate film of the present invention will be unsatisfactory.

The average particle diameter of the inert fine particles A is preferably 50 to 200 nm, more preferably 60 to 120 nm.

The volume shape factor (f) represented by the following expression (2) is preferably 0.3 to $\pi/6$, more preferably 0.4 to $\pi/6$.

$$f = V/R^3 \tag{2}$$

wherein f is a volume shape factor, V is a volume of the particles ($\mu$m$^3$) and R is an average particle diameter ($\mu$m) of the particles.

A shape having a volume shape factor (f) of $\pi/6$ is a ball (sphere). Therefore, a shape of the particle having a volume shape factor (f) of 0.4 to $\pi/6$ is substantially a ball or sphere, or an elliptic ball like a rugby ball, all of which are particularly preferred. A particle having a volume shape factor (f) of less than 0.1, such as a needle-like particle, is not preferred because it causes a reduction in the magnetic characteristics of the magnetic layer.

The inert fine particles A are contained in an amount that the exposed surface of the resin layer A containing the particles A preferably has the protrusions at a density of 5,000 to 50,000/mm$^2$. The density is more preferably 7,500 to 40,000/mm$^2$, particularly preferably 10,000 to 30,000/mm$^2$.

When the density of the protrusions on the exposed surface is less than 5,000/mm$^2$, the friction of the magnetic layer against the magnetic head will be large, the repetitive running durability of the magnetic layer will deteriorate, and transportability in the process of film formation and scratch resistance will be unsatisfactory. On the other hand, when the density of the protrusions is more than 50,000/mm$^2$, the number of fallen protrusions and drop-out will increase disadvantageously.

It is often desirable that the resin layer A should not contain the inert fine particles, particularly inert fine particles having an average particle diameter of not smaller than 40 nm. A magnetic layer is provided on the exposed surface of the resin layer A to form a magnetic recording medium. When the resin layer A contains the inert fine particles A, it is suitable for forming a thin metal layer, for example, as the magnetic layer. On the other hand, when the resin layer A does not contain the inert fine particles, it is suitable for further forming a diamond-like carbon layer on the magnetic layer.

The inert fine particles A for the resin layer A and the inert fine particles B for the resin layer B may be either internally separated-out particles or added particles. The added particles are preferred. The added particles include, for example, fine particles of heat resistant organic polymers such as crosslinked silicone resins, crosslinked polystyrene, crosslinked styrene-divinylbenzene copolymers, polymethyl methacrylate, methyl methacrylate copolymers, crosslinked methyl methacrylate copolymers, polytetrafluoroethylene, polyvinylidene fluoride, polyacrylonitrile, benzoguanamine resins, and the like; and fine particles of inorganic compounds such as silica, alumina, titanium dioxide, kaolin, talc, graphite, calcium carbonate, feldspar, molybdenum disulfide, carbon black, barium sulfate, and the like.

As the other particles in the case where the inert particles B consist of the second particles, colloidal silica and alumina having such a crystal form as a, g, d, q or the like are preferably used particularly for the inert fine particles B, in addition to the above fine particles having an average particle diameter of 0.001 to 0.1 $\mu$m.

In the above first laminate film of the present invention, the exposed surface of the resin layer A preferably has a center plane average roughness $^AWR_a$ of not more than 10 nm, more preferably not more than 5 nm, much more preferably not more than 2 nm, particularly preferably not more than 1 nm.

The exposed surface of the resin layer B preferably has a center plane average roughness $^BWR_a$ of 2 nm or more and less than 15 nm. $^BWR_a$ is more preferably 3 to 10 nm, particularly preferably 3 to 7 nm.

Further, it is advantageous that $^BWR_a$ be preferably larger than $^AWR_a$ by not less than 1 nm, more preferably not less than 1.5 nm.

When $^BWR_a$ is larger than 15 nm, the wide protrusions on the exposed surface of the resin layer A will be difficult to have the above height and width. When $^BWR_A$ is less than 2 nm, handling properties such as transportability and the running property of a tape formed of such laminate film will be unsatisfactory.

Further, when $^BWR_a$ is smaller than $^AWR_a$, handling properties such as transportation in the process of film formation, scratching, wind-up and unwinding will deteriorate due to the flat surface of the resin layer B, a blocking phenomenon will occur due to deteriorated slipperiness between films, roll formation will deteriorate, and productivity and yield of product will decline, thereby boosting production costs disadvantageously.

The first laminate film of the present invention can be produced by conventionally known methods or methods accumulated in the industry. Of the methods, a coextrusion method is preferred. For example, a biaxially oriented polyester film is manufactured as follows. A polyester A of a smooth surface layer containing the above inert fine particles A and a polyester B of a rough surface layer containing the inert fine particles B are laminated together in a molten state within an extruder die or before the extruder die (generally the former called a multi-manifold system and the latter a feed block system), formed into a laminate structure having the above-described suitable thickness ratio, coextruded from the die into a film at a temperature of melting point Tm °C. to (Tm+70) °C., and then quenched to solidify at 40 to 90° C. to obtain an unstretched laminate film. Thereafter, the unstretched laminate film is stretched to 2.5 to 8.0 times, preferably 3.0 to 7.5 times, in one direction (in the longitudinal direction or transverse direction) at a temperature of (Tg−10) to (Tg+70) °C. (Tg: glass transition temperature of the polyester) and then stretched to 2.5 to 8.0 times, preferably 3.0 to 7.5 times in a direction perpendicular to the above direction at a temperature of Tg to (Tg+70) °C. according to an usually employed method. The film may be further re-stretched in the longitudinal direction and/or transverse direction(s) as required. That is, 2-, 3-, 4- or multi-stage stretching may be carried out. The total stretch ratio is generally 9 times or more, preferably 12 to 35 times, more preferably 15 to 26 times in terms of area stretch ratio. Subsequently, the biaxially oriented film is heat set to crystallize it at a temperature of (Tg+70) to (Tm−10) °C, e.g., 180 to 250° C., whereby the film is provided with excellent dimensional stability. The heat setting time is preferably 1 to 60 sec.

With the above method, a biaxially oriented laminate polyester film having good adhesion between layers is obtained.

The method of the above example is suitable in the case where the resin layers A and B are both formed from polyethylene-2,6-naphthalene dicarboxylate or polyethylene terephthalate and is also suitable in the case where only the layer A or only the layer B is formed from polyethylene-2, 6-naphthalene dicarboxylate or polyethylene terephthalate.

In the production of the first laminate film, the thermoplastic resin may contain additives other than the above inert fine particles as desired, such as a stabilizer, colorant, agent for adjusting the resistivity of a molten polymer and the like.

In the present invention, to improve various performance parameters such as head-touch and running durability as a magnetic recording medium and reduce the thickness of the film at the same time, the Young's moduli in the longitudinal and transverse directions of the first laminate film of the present invention are preferably adjusted to not less than 450 kg/mm$^2$ and not less than 600 kg/mm$^2$, more preferably not less than 480 kg/mm$^2$ and not less than 680 kg/mm$^2$, particularly preferably not less than 550 kg/mm$^2$ and not less than 800 kg/mm$^2$, the most preferably not less than 550 kg/mm$^2$ and not less than 1,000 kg/mm$^2$, respectively. It is preferable that the degree of crystallinity of the polyethylene terephthalate layer is 30 to 50% and that of the polyethylene-2,6-naphthalene dicarboxylate layer is preferably 28 to 38%. If below the lower limits, thermal shrinkage will be large, while if above the upper limits, the abrasion resistance of the resulting laminate film will deteriorate, whereby white powders are liable to generate when the laminate film is brought into slide contact with the surface of the roll or guide pin.

In the first laminate film of the present invention, it is preferred that the thickness of the resin layer A be at least 0.8 μm and the thickness of the resin layer B be at least ½ of the average particle diameter $d_B$ (defined the same as above) of the inert fine particles contained therein.

The first laminate film of the present invention preferably has a thickness of 2.5 to 20 μm, preferably 2.5 to 10 μm, more preferably 3.0 to 7.0 μm.

From the first laminate film of the present invention, there can be formed a deposition type magnetic recording medium for high-density recording which is, in particular, excellent in output at a short wavelength range and electromagnetic conversion characteristics such as SIN and C/N and which is almost free from a drop-out and a small error rate by forming a thin ferromagnetic metal layer of iron, cobalt, chromium or an alloy or oxide comprising them as a main component on the exposed surface of the resin layer A by means of vacuum deposition, sputtering or ion plating, a protective layer of diamond-like carbon (DLC) or the like and a fluorine-containing carboxylic acid-based lubricant layer on the surface of the thin ferromagnetic metal layer in the order named, and further a known back-coat layer on the exposed surface of the resin layer B, according to use and application and as required. This deposition type electromagnetic recording medium is extremely useful as a tape medium for analog signal recording Hi8, digital video cassette recorder (DVC) for digital signal recording, data 8 mm and DDSIV.

In other words, according to the present invention, secondly, there is also provided a magnetic recording medium consisting of the first laminate film of the present invention and a magnetic recording layer formed on the exposed surface of the resin layer A.

From the first laminate film of the present invention, there can also be formed a metal coated magnetic recording medium for high-density recording which is, in particular, excellent in output at a short wavelength range, and electromagnetic conversion characteristics such as S/N and C/N and which is almost free from a drop-out and a small error rate by uniformly dispersing needle-like magnetic fine powders of iron or containing iron as a main component in a binder such as vinyl chloride or vinyl chloride-vinyl acetate copolymer, coating the resulting dispersion on the exposed surface of the resin layer A to ensure that the thickness of a magnetic layer be not larger than 1 μm, preferably 0.1 to 1 μm, and further forming a back-coat layer on the exposed surface of the resin layer B by a known method. Titanium oxide fine particles may be dispersed in the same organic binder as that for the magnetic layer and the resulting dispersion may be coated on the layer A as required to form a non-magnetic layer as an underlying layer of the metal powder-containing magnetic layer. This metal coated magnetic recording medium is extremely useful as a tape medium for an analog signal recording 8 mm video, Hi8, b-cam SP, W-VHS, digital signal recording digital video cassette recorder (DVC), data 8 mm, DDSIV, digital b-cam, D2, D3, SX, and the like.

Further, from the first laminate film of the present invention, there can be formed a deposition type magnetic recording medium for high-density recording which is, in particular, excellent in output at a short wavelength range, and electromagnetic conversion characteristics such as SIN and C/N and which is almost free from a drop-out and a small error rate by uniformly dispersing needle-shaped fine magnetic powders such as iron oxide or chromium oxide, or lamellar magnetic fine powders such as barium ferrite in a binder such as vinyl chloride or vinyl chloride-vinyl acetate copolymer, coating the resulting dispersion on the smooth surface of the thermoplastic resin layer A to ensure that the thickness of a magnetic layer be not larger than 1 μm, preferably 0.1 to 1 μm, and further forming a back-coat layer on the front surface of the thermoplastic resin layer B by a known method. Titanium oxide fine particles may be dispersed in the same organic binder as that for the magnetic layer and the resulting dispersion may be coated on the layer A as required to form a non-magnetic layer as an underlying layer of the metal powder-containing magnetic layer. This oxide coated magnetic recording medium is useful as a high-density oxide coated magnetic recording medium such as a data streamer QIC for digital signal recording.

The above-described W-VHS is a VTR for analog HDTV signal recording and DVC is applicable to digital HDTV signal recording. It can be said that the film of the present invention is an extremely useful base film for a magnetic recording medium for these VTRs applicable to HDTV signal.

According to the present invention, thirdly, the above objects and advantages of the present invention can be attained by a biaxially oriented laminate film (to be referred to as "second laminate film of the present invention" hereinafter) which comprises a thermoplastic resin layer C, a thermoplastic resin layer A and a thermoplastic resin layer B which are laminated in the order named, wherein the surface not in contact with the thermoplastic resin layer A of the thermoplastic resin layer C has protrusions having an average height of 2 to 85 nm and an average width of 20 to 500 μm at a density of 4 to 2,500/mm$^2$; and the thermoplastic resin layer B contains inert fine particles and the surface not in contact with the thermoplastic resin layer A of the thermoplastic resin layer B is rougher than the surface not in contact with the thermoplastic resin layer A of the thermoplastic resin layer C.

The second laminate film of the present invention comprises the thermoplastic resin layer C (to be referred to as "resin layer C" hereinafter), the resin layer A and the resin layer B. These resin layers are laminated in the above order. Therefore, the resin layer C has a surface in contact with the resin layer A and an exposed surface not in contact with the resin layer A, the resin layer A has no exposed surface as it is in contact with the resin layer C and the resin layer B, and the resin layer B has a surface in contact with the resin layer A and an exposed surface not in contact with the resin layer A.

The thermoplastic resins constituting these resin layers may be the same or different and the same resins listed for the first laminate film may be used.

The exposed surface of the resin layer C has protrusions having an average height of 2 to 85 nm and an average width of 20 to 500 μm at a density of 4 to 2,500/mm$^2$. The protrusions on the resin layer C of the second laminate film correspond to the wide protrusions on the resin layer A of the first laminate film. Therefore, it should be understood that a description of the wide protrusions on the resin layer A of the first laminate film can be directly applied to the protrusions on the resin layer C of the second laminate film which are not described herein.

In the second laminate film, it is advantageous to form the wide protrusions on the exposed surface of the resin layer C by making use of the thrusting-up action ascribed to the inert fine particles B contained in the resin layer B.

To develop this action efficiently, it is desirable that the thickness of the resin layer A and the average particle diameter of the inert fine particles B satisfy the expression (1) described previously.

It should be understood that a description of the first laminate film regarding the inert fine particles B and what is related to the inert fine particles can be directly applied to those in the second laminate film.

The resin layer C (may be referred to as "coating layer C") may contain inert fine particles C having an average particle diameter of 10 to 50 nm, preferably 12 to 45 nm, more preferably 15 to 45 nm, and a volume shape factor of 0.1 to π/6, preferably 0.3 to π/6, more preferably 0.4 to π/6.

When the average particle diameter of the inert fine particles C is less than 10 nm, the wind-up property of the base film is liable to be insufficient and a reduction in output caused by repeated contact of the tape with the head tends to become large (i.e., the film has poor durability in still mode). On the other hand, when the average particle diameter is more than 50 nm, the electromagnetic conversion characteristics are liable to deteriorate.

This is because roll formation at the time of winding-up the base film becomes inferior and the magnetic characteristics of a thin film magnetic layer when a thin film magnetic recording medium comprises the base film of the present invention tends to deteriorate in the case where the volume shape factor (f) is smaller than 0.1, e.g., a flake-shaped particle.

The density of the protrusions ascribed to the inert fine particles C is preferably 2.0 to 50.0/μm$^2$, more preferably 3.0 to 40.0/μm$^2$, particularly preferably 4.0 to 30.0/μm$^2$.

The average height of the protrusions ascribed to the inert fine particles C is preferably 30% or more but less than 200%, more preferably 40 to 180%, particularly preferably 50 to 160% of the average particle diameter of the inert fine particles C.

The material of the inert fine particles C may be the same as the materials of the inert fine particles A and B listed for the first laminate film, or core-shell-structured particles, e.g., core-shell particles in which the core is formed of crosslinked polystyrene or silica and the shell is formed of polymethyl methacrylate. The inert fine particles C are particularly preferably crosslinked silicone resin particles or core-shell particles.

When the density of the protrusions ascribed to the inert fine particles C on the exposed surface of the coating layer C is less than 2.0/μm$^2$, the roll formation of the base film becomes inferior and a reduction in output caused by repeated contact with the head when a magnetic recording medium comprises the base film of the present invention is large (the film has poor durability in still mode). These results are problems in practical application. When the density is more than 50.0/μm$^2$, the electromagnetic conversion characteristics deteriorate and further the particles are liable to fall off disadvantageously.

When the average height of the protrusions ascribed to the inert fine particles C on the coating layer C is less than 30% of the average particle diameter of the inert fine particles C, the friction of a magnetic recording medium formed from the base film against the head becomes too high disadvantageously. When the average height of the protrusions is 200% or more of the average particle diameter of the inert fine particles C, the electromagnetic conversion characteristics deteriorate disadvantageously.

The polymer material of the coating layer C may be the same as, or different from, the material of the resin layer A or the resin layer B, or any polymer material as far as the coating layer C is allowed to be formed from it by a known coextrusion method or in-line or off-line coating method, for example. A binder resin used when the coating layer C is formed by a coating method is preferably an aqueous polyester resin, aqueous acrylic resin, aqueous polyurethane resin or the like, of which an aqueous polyester resin is particularly preferred.

The aqueous polyester resin is a polyester resin comprising an acid component such as a polyvalent carboxylic acid exemplified by terephthalic acid, isophthalic acid, phthalic acid, 1,4-cyclohexanedicarboxylic acid, 2,6-naphthalenedicarboxylic acid, 4,4-diphenyldicarboxylic acid, adipic acid, sebacic acid, dodecaneditrimellitic acid, succinic acid, 5-Na sulfoisophthalic acid, 2-K sulfoterephthalic acid, trimellitic acid, trimesic acid, trimellitic acid monopotassium salt, p-hydroxybenzoic acid, and the like and a glycol component such as a polyvalent hydroxyl compound exemplified by ethylene glycol, diethylene glycol, propylene glycol, propylene glycol, 1,4-butanediol, 1,6-hexanediol, 1,4-cyclohexane dimethanol, p-xylylene glycol, dimethylolpropionic acid, addition product of bisphenol A with ethylene oxide, and the like. The aqueous polyester resin includes also graft polymers and block copolymers in which an acryl polymer chain is bonded to the polyester chain of the above polyester resins; and acryl-modified polyester resins in which two polymers constitute a specific physical structure (IPN, core-shell) in the microfine particle. The aqueous polyester resin may be of a water-soluble, emulsion or fine dispersion type. To provide hydrophilic nature, a sulfonic acid group, carboxylic acid group or polyether unit may be introduced into the molecule of the aqueous polyester resin.

The average thickness ($t_C$) of the coating layer C is preferably 1 to 500 nm and more preferably satisfies the relationship represented by the following expression (3) in which the average particle diameter of the inert fine particles C is represented by $d_C$.

$$0.1 \leq t_C/d_C \leq 10 \tag{3}$$

An example of the coating layer C in the present invention is described below.

The coating layer C can be formed by applying a solution, preferably an aqueous coating solution, containing the inert fine particles C and a binder resin to one surface of the resin layer A, followed by drying. The solid content concentration of the coating solution is preferably 1 to 10 wt %, more preferably 1.5 to 8 wt %, particularly preferably 2 to 6 wt %. The coating solution (preferably aqueous coating solution) may contain other components such as a surfactant, stabilizer, dispersant, UV absorber, thickening agent and the like, as desired.

Coating is carried out on a thermoplastic resin laminate film before final stretching and the film is preferably stretched in at least one direction after coating. Before or during this stretching, the coating film is dried. During this process, coating is preferably carried out on an unstretched thermoplastic resin laminate film or longitudinally (monoaxially) stretched thermoplastic resin laminate film, particularly preferably a longitudinally (monoaxially) stretched thermoplastic resin laminate film. The coating method is not critical and preferably roll coating, die coating or the like.

The resin layer C is preferably stretched monoaxially or biaxially as described above.

It should be understood that the description of the resin layer A of the first laminate film can be directly applied to the matters not described about the resin layer A of the second laminate film except for the protrusions on the exposed surface thereof.

Similarly, it should be understood that the description of the resin layer B of the first laminate film can be directly applied to the matters not described about the resin layer B of the second laminate film.

In the second laminate film of the present invention, the exposed surface of the resin layer B is rougher than the exposed surface of the resin layer C, e.g., the coating layer C.

In the above second laminate film of the present invention, the exposed surface of the resin layer C preferably has a center plane average roughness $^CWR_a$ of not more than 10 nm, more preferably not more than 5 nm, much more preferably not more than 2 nm, particularly preferably not more than 1 nm.

The exposed surface of the resin layer B preferably has a center plane average roughness $^BWR_a$ of 2 nm or more and less than 15 nm. $^BWR_a$ is more preferably 3 to 10 nm, particularly preferably 3 to 7 nm.

Further, it is advantageous that $^BWR_a$ be preferably larger than $^CWR_a$ by not less than 1 nm, more preferably not less than 1.5 nm.

The reasons for inconvenience encountered when the value of $^BWR_a$ is outside the above range and smaller than $^CWR_a$ are the same as those when the value of $^BWR_a$ is outside the specified range and smaller than $^AWR_a$.

The second laminate film of the present invention can be produced by coextrusion, biaxial stretching and heat setting, like the first laminate film. The method for producing the resin layer C has already been described above.

In the second laminate film of the present invention, a magnetic layer can be formed on the exposed surface of the resin layer C.

In other words, according to the present invention, fourthly, there is provided a magnetic recording medium comprising the second laminate film of the present invention and a magnetic recording layer formed on the exposed surface of the resin layer C of the laminate film.

It should be understood that the above description of the first laminate film can be directly applied to the magnetic recording layer and the magnetic recording medium.

According to the present invention, therefore, there can be provided a laminate film useful as a high-density magnetic recording medium which is excellent in wind-up property, non-defect property, slipperiness and handling properties, particularly in electromagnetic conversion characteristics, drop-out, running property and durability of the magnetic layer.

The following examples are given to further illustrate the present invention. Measurement methods used in the present invention are as follows.

(1) Intrinsic viscosity

This was obtained from a value measured in an orthochlorophenol solvent at 35° C.

(2) Average particle diameter I of particles (average particle diameter: not smaller than 0.06 $\mu$m)

This was measured using the CP-50 model centrifugal particle size analyzer of Shimadzu Corporation. A particle diameter, "equivalent sphere diameter" equivalent to 50 mass percent, was read from a cumulative curve of the particles of each diameter and the amount thereof calculated based on the obtained centrifugal sedimentation curve, and taken as the average particle diameter (refer to "Book of Particle Size Measurement Technology" issued by Nikkan Kogyo Press, pp. 242–247, 1975).

(3) Average particle diameter II of particles (average particle diameter: smaller than 0.06 $\mu$m)

Particles having an average particle diameter smaller than 0.06 μm which form small protrusions were measured by a light scattering method. That is, it was expressed by the "equivalent sphere diameter" of the particles which account for 50 wt % of the total of all particles obtained by the NICOMP Model 270 submicron particle sizer of Nicomp Instruments Inc.

(4) Volume shape factor F

A photo of each particle is taken with a magnification for each size by a scanning electron microscope. The maximum diameter of a projected plane and the volume of the particle are calculated from the photo using an image analyzer Luzex 500 of Nippon Regulator Co. Ltd. and the volume shape factor F is obtained from the following expression (5).

$$F = V/D^3 \quad (5)$$

wherein V is a volume of the particle ($\mu m^3$) and D is the maximum diameter of the projected plane ($\mu m$).

(5) Density of protrusions on the surface of laminate film not having thermoplastic resin layer C The density of the protrusions on the surface of the film is measured by a scanning electron microscope. That is, five photos of the surface of the laminate film are taken at random at a magnification of 5,000 or 10,000, and the number of the protrusions on the surface is counted. The number of the protrusions per 1 mm² is converted from the average value of the obtained count, and taken as the density of the protrusions on the surface of the film.

(6) Density of protrusions on the surface of thermoplastic resin layer A of laminate film having thermoplastic resin layer C The density of the protrusions on the surface of the thermoplastic resin layer A is measured by a scanning electron microscope. That is, five photos of the protrusions on the surface of the thermoplastic resin layer A are taken from the surface of the coating layer C at random at a magnification of 5,000 or 10,000, and the number of protrusions on the surface is counted. The number of protrusions per 1 mm² is converted from the average value of the obtained count, and taken as the density of the protrusions on the surface of the thermoplastic resin layer A.

(7) Density of protrusion on the surface of coating layer C

The density of the protrusions on the surface of the coating layer C is measured by a scanning electron microscope. That is, 30 photos of the surface of the coating layer C are taken at random at a magnification of 30,000, and the number of protrusions on the surface is counted. The number of protrusions per 1 mm² is converted from the average value of the obtained count, and taken as the density of the protrusions on the surface of the coating layer C.

(8) Layer thickness

The thickness of a film is measured at 10 locations of the film at random by a micrometer, and an average value of the measurement values is taken as the total thickness of the film. The thickness of a thin layer is measured by the following method, while the thickness of a thick layer is obtained by subtracting the thickness of the thin layer from the total thickness. That is, using a secondary ion mass spectrometer (SIMS), the concentration ratio (M+/C+) of an element (M+) to the carbon element (C+) of the polyester is taken as a particle concentration, and the portion from the surface up to a depth of 5,000 nm is analyzed in the thickness direction, where the element M+ is the element with the highest concentration in the layer, the thickness of which is to be measured. In the vicinity of the surface of the layer, the particle concentration is measured to be low but becomes higher as the distance of the measured point from the surface increases. In the case of the present invention, there are two cases, that is, one case is a case where after the particle concentration becomes a stable value 1, it increases or decreases to a stable value 2, and the other is a case where after the particle concentration becomes a stable value 1, it decreases continuously. Based on this distribution curve, in the former case, a depth which provides a particle concentration of (stable value 1+stable value 2)/2 is taken as the thickness of the layer whereas in the latter case, a depth that provides a particle concentration of one-half of the stable value 1 (deeper than the depth giving a stable value 1) is taken as a thickness of the layer. Measurement conditions are as follows.

(1) measuring instrument secondary ion mass spectrometer (SIMS); 6300 SIMS of Physical Electronics Co.

(2) measurement conditions species of primary ions: $O_2^+$ polarity of secondary ion: positive ion incident angle: 60° energy of primary ions: 2 keV (1 keV/particle) amount of primary ion current: 200 mA luster area: 400 $\mu m \times 400$ $\mu m$ analysis area: 120 $\mu m \times 120$ $\mu m$ electron beam compensation: yes In the case where the most of particles contained in an area of from the surface layer to a depth of 5,000 nm are organic polymer particles other than a silicone resin, it is difficult to measure them with SIMS. Therefore, a concentration distribution curve similar to the above is measured by FT-IR (Fourier transform infrared spectrometry) or XPS (X-ray photo-electron spectrometry) to obtain a thickness of the layer while the film is etched little by little from the surface,.

(9) Protrusions having an average height of 2 to 85 nm and an average width of 20 to 500 μm on film surface Using the non-contact 3-D roughness meter (TOPO-3D) of WYKO Co., the measurement is made under such conditions as a measurement area of 234 $\mu m \times 240$ $\mu m$ (0.056 mm²) and a measurement magnification of 40 or a measurement area of 956 $\mu m \times 980$ $\mu m$ (0.937 mm²) and a measurement magnification of 10 depending on the size and height of the protrusions, and the average height and average width of the protrusions are read from the obtained 3-D chart.

(10) Non-contact 3-D center plane average roughness ($WR_a$)

Using the non-contact 3-D roughness meter (TOPO-3D) of WYKO Co., the measurement is made under such conditions as a measurement area of 242 $\mu m \times 239$ $\mu m$ (0.058 mm²) and a measurement magnification of 40, and $WR_a$ is calculated based on the following expression (6) from the surface analysis using software built in the roughness meter.

$$WRa = \sum_{k=1}^{M}\sum_{j=1}^{N} |z_{jk} - \overline{Z}|/(M \cdot N) \quad (6)$$

$$\text{wherein } \overline{Z} = \sum_{k=1}^{M}\sum_{j=1}^{N} z_{jk}/(M \cdot N)$$

$Z_{jk}$ is a height on the 3-D roughness chart at a j-th position and a k-th position in each of the directions when a measurement direction (242 $\mu m$) and a direction (239 $\mu m$) perpendicular to it are divided into M and N sections, respectively.

(11) Young's modulus

Using the Tensilon tensile tester of Toyo Baldwin Co., a 300 mm long and 12.7 mm wide sample film is pulled at a strain rate of 10% per minute in a chamber controlled to a temperature of 20° C. and a humidity of 50%, and an initial straight line portion of the tensile stress-strain curve is used to calculate the Young's modulus of the film based on the following expression (7).

$$E = \Delta\sigma/\Delta\epsilon \quad (7)$$

wherein E is a Young's modulus (kg/mm$^2$), $\Delta\sigma$ is a stress difference between two points on a straight line due to the initial average sectional area, and $\Delta\epsilon$ is a strain difference between the two points.

(12) Wind-up property

After wind-up conditions at the time of slitting are optimized, a 560 mm wide and 9,000 m long film is slit and rolled onto 10 rolls which are then left for one week. The wind-up property of the rolls is evaluated based on the following criteria from the number of rolls which can be commercialized judged from the state of occurrence of film wrinkles.

| number of commercializable rolls | evaluation |
|---|---|
| 8 or more | ⊚ |
| 5 to 7 | ○ |
| 3 to 4 | X |
| 2 or less | XX |

(13) Production of magnetic tape and evaluation of characteristics

Two 100% cobalt ferromagnetic thin film layers are formed on the surface of the outermost layer A or the coating layer C of a biaxially oriented laminate film by a vacuum deposition method so as to have a total thickness of 0.2 μm (each layer having a thickness of about 0.1 μm), a diamond-like carbon (DLC) film layer and a fluorine-containing carboxylic acid-based lubricant layer are formed sequentially on the above surface of the thin film layers, and a back coat layer is further formed on the surface of the thermoplastic resin layer B by a known method. Thereafter, the resulting laminate is slit to a width of 8 mm and the thus obtained tape is loaded into a commercial 8 mm video cassette. Then the following characteristics of this tape are measured.

apparatus used: 8 mm video tape recorder, EDV-6000 of Sony Corporation

C/N measurement: noise meter of Shibasoku Co., Ltd.

(a) C/N measurement

A signal having a recording wavelength of 0.5 gm (frequency of about 7.4 MHz) is recorded, the ratio of values of its reproduced signal at 6.4 MHz and 7.4 MHz is taken as the C/N of the tape which is expressed as a relative value when the C/N of a deposited tape for a commercial 8 mm video is 0 dB.

(b) running property under high-temperature and high-humidity conditions

After recording and reproduction of the tape are repeated 500 times at a normal speed under the conditions of a high temperature of 40° C. and a high humidity of 80% RH, the C/N of the tape is measured and the deviation from the initial value is evaluated based on the following criteria.

⊚: +0.0 dB or more based on the standard value

○: −1.0 to +0.0 dB based on the standard value

X: less than −1.0 dB based on the standard value (c) still characteristics

A 4.2 MHz image signal is recorded on the above-described deposited tape and the time elapsed before its reproduction output is attenuated to 50% is measured. This time is evaluated based on the following criteria.

⊚: 120 minutes or more

○: 60 to 120 minutes

X: less than 60 minutes

(14) Scratch resistance of film

After slitting, a film is sampled from the final product roll and the smooth surface of the film is observed through an optical microscope at a magnification of 100 to count the number of scratches within 20 fields of view. The evaluation criteria are as follows.

| number of scratches | evaluation |
|---|---|
| 0 | ⊚ |
| 1 | ○ |
| 2 or more | X |

(15) Average height of protrusions

Using the Nano Scope II atomic force microscope (AFM) of Digital Instruments Co., an area of 2 μm×2 μm is measured with the pixel number of 256 lines×256 pixels and the measured Rz (average roughness of 10 spots) is taken as the average height of the protrusions.

EXAMPLE 1

To dimethyl terephthalate and ethylene glycol were added manganese acetate as an ester exchange catalyst, antimony trioxide as a polymerization catalyst, phosphorous acid as a stabilizer and inert particles shown in Table 1 and Table 2 as a lubricant, and the mixture was polymerized in an usually employed method to obtain polyethylene terephthalates for the layer A and the layer B (to be referred to as resin A and resin B, respectively) having an intrinsic viscosity of 0.60.

The resin A and the resin B were dried at 170° C. for 3 hours, supplied to two extruders, molten at a melting temperature of 280 to 300° C., laminated together through a multi-manifold coextrusion die in such a manner that the resin layer B was placed on one side of the resin layer A, and quenched to obtain a 83 μm thick unstretched laminate film.

The thus obtained unstretched film was preheated, stretched to 3.2 times between low-speed and high-speed rolls at a film temperature of 95° C., and quenched. Subsequently, an aqueous coating solution (having a total solid content concentration of 1.5 wt % and containing polyoxyethylene nonylphenylether having an HLB value of 17.1 as a surfactant in an amount of 15 wt % of the total solid content) containing a resin and a particle material shown in Table 1 was coated on the surface of the layer A of the longitudinally stretched film by kiss-roll coating to form a coating layer C. This longitudinally stretched film was then supplied to a stenter and stretched in the transverse direction at a stretch ratio of 4.1 at 110° C. The thus obtained biaxially oriented film was heat set with hot air at 220° C. for 4 seconds to obtain a 9.8 μm thick biaxially oriented laminate polyester film. The thickness of each layer was adjusted by changing the discharge amounts of the two extruders. The Young's moduli of this film were 500 kg/mm$^2$ in the longitudinal direction and 700 kg/mm$^2$ in the transverse direction.

The surface characteristics, the ratio $t_A/d_B$ of the thickness $t_A$ of the smooth surface layer A to the average particle diameter $d_B$ of the largest particles out of the inert particles contained in the rough surface layer B and the wind-up property of the thus obtained film and the characteristics of a thin ferromagnetic metal film deposited magnetic tape comprising this film are shown in Table 3.

EXAMPLES 2 TO 4 AND COMPARATIVE EXAMPLE 3

Biaxially oriented laminate polyester films were obtained in the same manner as in Example 1 except that the resin and the inert particles forming the coating layer C, the particles contained in the thermoplastic resin layers A and B, and the thickness of each layer thereof were changed as shown in Tables 1 and 2. Comparative Example 3 is a single-layer structured film of the prior art. The characteristics of the thus obtained films and the characteristics of thin ferromagnetic metal film deposited magnetic tapes comprising these films are shown in Table 3.

EXAMPLES 5 TO 9 AND COMPARATIVE EXAMPLES 1 AND 2

Polyethylene-2,6-naphthalate (PEN) resins A and B for the flat surface layer A and the rough surface layer B were obtained in the same manner as in Example 1 except that the particles shown in Tables 1 and 2 were used and dimethyl 2,6-naphthalene dicarboxylate was used in place of dimethyl terephthalate.

The resins A and B were dried at 170° C. for 6 hours and the thickness of each layer was adjusted in the same manner as in Example 1 to obtain unstretched laminate films of Examples 5 to 9 and Comparative Examples 1 and 2.

The thus obtained unstretched laminate films were preheated and stretched to 3.6 times between high-speed and low-speed rolls at a film temperature of 135° C., and quenched. Thereafter, the laminate films were coated with the aqueous coating solution for the coating layer C shown in Table 1 in the same manner as in Example 1, supplied to a stenter, and stretched at a stretch ratio of 6.0 in the transverse direction at 155° C. The thus obtained biaxially oriented films were heat set with hot air at 200° C. for 4 seconds to obtain 4.6 $\mu$m-thick biaxially oriented laminate polyester films. The Young's moduli of these films were 560 kg/mm$^2$ in the longitudinal direction and 1,100 kg/mm$^2$ in the transverse direction. Examples 7, 8 and 9 had a longitudinal stretch ratio of 4.9 and a transverse stretch ratio of 5.0 and the biaxially oriented laminate polyester films of these examples had a Young's moduli of 600 kg/mm$^2$ in the longitudinal direction and 900 kg/mm$^2$ in the transverse direction. The characteristics of the thus obtained films and the characteristics of thin ferromagnetic metal film deposited magnetic tapes comprising these films are shown in Table 3.

TABLE 1

| | Coating layer C | | | | Thermoplastic resin layer B | | | | | |
|---|---|---|---|---|---|---|---|---|---|---|
| | | | | | | Particles having the largest average particle diameter | | | Other particle | |
| | Type of resin *1 | Material particles | Volume shape factor | Average particle diameter (nm) | Density of particles (number/$\mu$m$^2$) | Type of resin *2 | Material of particles | Average particle diameter ($\mu$m) | Content (w %) | Material of particles | Average particle diameter ($\mu$m) | Content (w %) |
| Ex. 1 | A | silica | 0.5 | 16 | 13 | PET | silicone | 0.6 | 0.05 | θ-alumina | 0.03 | 0.2 |
| Ex. 2 | A | crosslinked polystyrene | 0.4 | 30 | 10 | PET | silica | 0.5 | 0.15 | silica | 0.08 | 0.2 |
| Ex. 3 | A | silicone | 0.4 | 28 | 15 | PET | silica | 0.6 | 0.1 | zirconia | 0.04 | 0.2 |
| Ex. 4 | B | acryl | 0.5 | 45 | 2.5 | PET | silicone | 0.5 | 0.2 | θ-alumina | 0.03 | 0.3 |
| Ex. 5 | B | silica | 0.5 | 24 | 9 | PEN | silicone | 0.6 | 0.05 | silica | 0.08 | 0.2 |
| Ex. 6 | B | silicone | 0.4 | 20 | 17 | PEN | silica | 0.5 | 0.15 | θ-alumina | 0.03 | 0.2 |
| Ex. 7 | B | crosslinked polystyrene | 0.4 | 20 | 12 | PEN | silicone | 0.6 | 0.08 | silica | 0.08 | 0.2 |
| Ex. 8 | B | silica | 0.5 | 28 | 6 | PEN | calcium carbonate | 0.3 | 0.3 | silica | 0.08 | 0.3 |
| Ex. 9 | C | silicone | 0.4 | 35 | 10 | PEN | crosslinked polystyrene | 0.5 | 0.1 | zirconia | 0.03 | 0.2 |
| Comp. Ex. 1 | A | silica | 0.5 | 24 | 12 | PEN | silica | 0.8 | 0.2 | θ-alumina | 0.04 | 0.2 |
| Comp. Ex. 2 | A | silica | 0.5 | 24 | 12 | PEN | silica | 0.1 | 0.3 | θ-alumina | 0.04 | 0.2 |
| Comp. Ex. 3 | A | crosslinked polystyrene | 0.4 | 30 | 10 | PET | — *3 | — | — | — | — | — |

(In this and subsequent tables, "Ex." and "Comp. Ex." stand for "Example" and "Comparative Example", respectively.)
*1 Types of resin of coating layer C
A: acryl-modified polyester (SH551A of Takamatsu Yushi K.K.)
B: acryl-modified polyester (IN-170-6 of Takamatsu Yushi K.K.)
C: copolyester (2,6-naphthalene dicarboxylate/isophthalic acid/5-sodium sulfoisophthalic acid/ethylene glycol/additional product of 1 mole of bisphenol A with 2 moles of propylene oxide) = 90/5/5/70/30
*2 Types of resin of thermoplastic resin layer B
PET: polyethylene terephthalate
PEN: polyethylene-2,6-naphthalene dicarboxylate
*3 "—" in the table indicates that the inert fine particles are not contained.

TABLE 2

| | | | Average particle diameter (nm) | Volume shape factor | Density of particles (number/mm$^2$) | Layer thickness | | |
|---|---|---|---|---|---|---|---|---|
| | Type of resin *2 | Material of particles | | | | Layer A ($\mu$m) | Layer B ($\mu$m) | Layer C (nm) |
| Ex. 1 | PET | silicone | 100 | 0.4 | 25,000 | 5.5 | 0.8 | 4 |
| Ex. 2 | PET | calcium carbonate | 100 | 0.4 | 30,000 | 8.6 | 1.2 | 5 |
| Ex. 3 | PET | silica | 60 | 0.5 | 10,000 | 5.1 | 1.2 | 5 |
| Ex. 4 | PET | silica | 60 | 0.5 | 12,000 | 9.0 | 0.8 | 5 |
| Ex. 5 | PEN | silica | 50 | 0.5 | 45,000 | 4.2 | 1.0 | 4 |
| Ex. 6 | PEN | silica | 80 | 0.5 | 15,000 | 2.5 | 1.5 | 3 |
| Ex. 7 | PEN | silica | 60 | 0.5 | 15,000 | 5.3 | 1.0 | 3 |
| Ex. 8 | PEN | silica | 100 | 0.5 | 15,000 | 4.0 | 0.6 | 5 |
| Ex. 9 | PEN | silicone | 120 | 0.4 | 8,000 | 6.9 | 0.4 | 6 |
| Comp. Ex. 1 | PEN | silica | 60 | 0.5 | 20,000 | 2.6 | 2.0 | 4 |
| Comp. Ex. 2 | PEN | silicone | 100 | 0.4 | 20,000 | 4.7 | 0.1 | 4 |
| Comp. Ex. 3 | PET | silica | 100 | 0.5 | 25,000 | 9.8 | 0.0 | 5 |

*2 Types of resin of thermoplastic resin layer A
PET: polyethylene terephthalate,
PEN: polyethylene-2,6-naphthalene dicarboxylate

TABLE 3

| | Surface conditions of coating layer C | | | Height of protrusions | Surface roughness WR$_a$ | | | | Electro-magnetic conversion characteristics C/N | | | |
|---|---|---|---|---|---|---|---|---|---|---|---|---|
| | Protrusions | | | | | | | | | | | |
| | Average | | Density | | | | | | | | | |
| | Height (nm) | width ($\mu$m) | (number/mm$^2$) | AFM-Rz (nm) | Layer C (nm) | Layer B (nm) | $t_A/d_B$ | Wind-up property | ($\lambda = 0.5$ $\mu$m) (dB) | Running durability | Still characteristics | Scratch resistance |
| Ex. 1 | 7 | 60 | 130 | 20 | 1.7 | 4.0 | 9.2 | ○ | ±0 | ◉ | ○ | ◉ |
| Ex. 2 | 6 | 80 | 70 | 25 | 1.8 | 4.5 | 17.2 | ○ | ±0 | ◉ | ◉ | ◉ |
| Ex. 3 | 7 | 100 | 50 | 29 | 0.9 | 4.2 | 8.5 | ○ | +3.0 | ○ | ◉ | ○ |
| Ex. 4 | 6 | 60 | 120 | 50 | 0.7 | 4.8 | 18.0 | ◉ | +3.5 | ○ | ○ | ○ |
| Ex. 5 | 6 | 85 | 60 | 30 | 1.0 | 4.0 | 7.0 | ○ | +2.0 | ○ | ○ | ○ |
| Ex. 6 | 8 | 50 | 200 | 23 | 1.3 | 3.5 | 5.0 | ○ | +1.0 | ◉ | ◉ | ◉ |
| Ex. 7 | 7 | 70 | 100 | 20 | 0.8 | 3.7 | 8.8 | ◉ | +3.0 | ○ | ◉ | ○ |
| Ex. 8 | 4 | 55 | 160 | 30 | 1.3 | 3.6 | 13.3 | ○ | +1.0 | ◉ | ○ | ◉ |
| Ex. 9 | 3 | 40 | 300 | 38 | 0.8 | 4.3 | 8.4 | ○ | +2.0 | ○ | ◉ | ○ |
| Comp. Ex. 1 | 100 | 330 | 4 | 29 | 3.5 | 16.5 | 3.3 | ○ | −5.0 | ◉ | ○ | ◉ |
| Comp. Ex. 2 | not detected | | 0 | 26 | 1.5 | 2.8 | 47 | x | +1.5 | x | ○ | x |
| Comp. Ex. 3 | not detected | | 0 | 27 | 1.3 | 0.5 | ∞ | xx | +1.5 | ○ | ○ | ○ |

As is evident from Table 3, the laminate films of the present invention have one extremely flat surface, exhibit excellent electromagnetic conversion characteristics, and are extremely excellent in running durability and steel characteristics at a high temperature and a high humidity when magnetic recording media are formed therefrom due to the multiplication effect of fine protrusions formed on the surface by super fine particles having a specific shape contained in the coating layer C and fine particles contained in the thermoplastic resin layer A and protrusions having a small height and a large width which have no adverse influence on the electromagnetic conversion characteristics. In addition, the laminate films of the present invention have extremely excellent wind-up property as a base film due to the both effects of the protrusions having a small height and a large width and a rough opposite surface. On the other hand, the films of the prior art shown in Comparative Examples do not satisfy these four requirements at the same time.

EXAMPLE 10

Dimethyl terephthalate and ethylene glycol were polymerized by adding manganese acetate as an ester exchange catalyst, antimony trioxide as a polymerization catalyst, phosphorous acid as a stabilizer and inert particles shown in Table 4 as a lubricant in accordance with an usually used method to obtain polyethylene terephthalates (PET) for the layer A and the layer B (resin A and resin B) having an intrinsic viscosity of 0.60.

The resin A and the resin B were dried at 170° C. for 3 hours, supplied to two extruders, molten at a melting temperature of 280 to 300° C., laminated together through a multi-manifold coextrusion die in such a manner that the resin layer B was placed upon one side of the resin layer A, and quenched to obtain a 87 $\mu$m thick unstretched laminate film.

The thus obtained unstretched film was preheated, stretched to 3.3 times between low-speed and high-speed rolls at a film temperature of 100° C., and quenched. Thereafter, an aqueous coating solution (having a solid content of 1.5 wt % and containing polyoxyethylene nonylphenylether having an HLB value of 17.1 in an amount of 15 wt % of the total solid content) containing the binder resin and the particles C shown in Table 5 was coated on the layer A of the longitudinally stretched film by kiss-roll coating. This longitudinally stretched film was then supplied to a stenter and stretched in the transverse direction to 4.2 times at 110° C. The thus obtained biaxially oriented film was heat set with hot air at 220° C. for 4 seconds to obtain a 6.3 $\mu$m thick biaxially oriented laminate polyester film. The thickness of each layer was adjusted by changing the discharge amounts of the two extruders. The Young's modulus of this film was 500 kg/mm$^2$ in the longitudinal direction and 700 kg/mm$^2$ in the transverse direction.

The surface characteristics, the ratio $t_A/d_B$ of the thickness $t_A$ of the layer A to the average particle diameter $d_B$ of the largest particles out of the inert particles contained in the layer B and the wind-up property of this biaxially oriented laminate film and the characteristics of a thin ferromagnetic metal film deposited magnetic tape comprising this film are shown in Table 6.

EXAMPLES 11 TO 13

Biaxially oriented laminate polyester films were obtained in the same manner as in Example 10 except that the binder resin and particles for the coating layer C, the particles contained in the thermoplastic resin layers A and B, and the thickness of each layer were changed as shown in Tables 4 and 5. The characteristics of the thus obtained films and the characteristics of thin ferromagnetic metal film deposited magnetic tapes comprising these films are shown in Table 6.

EXAMPLES 14 TO 18

Polyethylene-2,6-naphthalates (PEN) (resins A and B) for the layers A and B were obtained in the same manner as in Example 4 except that the particles B shown in Table 4 were used and the same molar amount of 2,6-naphthalene dimethyl dicarboxylate was used in place of dimethyl terephthalate.

The resins A and B were dried at 170° C. for 6 hours and the thickness of each layer was adjusted in the same manner as in Example 4 to obtain unstretched laminate films of Examples 14 to 18.

The thus obtained unstretched films were preheated and stretched to 3.6 times between high-speed and low-speed rolls at a film temperature of 135° C., and quenched. Thereafter, the films were coated with the aqueous coating solution for the coating layer C shown in Table 5 in the same manner as in Example 4, supplied to a stenter, and stretched in the transverse direction to 6.0 times at 155° C. The thus obtained biaxially oriented films were heat set with hot air at 200° C. for 4 seconds to obtain 4.6 $\mu$m-thick biaxially oriented laminate polyester films. The Young's moduli of these films were 560 kg/mm$^2$ in the longitudinal direction and 1,100 kg/mm$^2$ in the transverse direction. The stretch ratios in the longitudinal direction and a transverse direction of Example 14 were 4.0 times and 5.0 times, respectively, and the Young's modulus of the biaxially oriented laminate polyester film of this example was 600 kg/mm$^2$ in the longitudinal direction and 900 kg/mm$^2$ in the transverse direction. The characteristics of the thus obtained films and the characteristics of thin ferromagnetic metal film deposited magnetic tapes comprising these films are shown in Table 6.

As is evident from Table 6, the laminate films of the present invention have one extremely flat surface, exhibit excellent electromagnetic conversion characteristics, and are extremely excellent in running durability and steel characteristics at a high temperature and a high humidity when magnetic recording media are formed therefrom due to the multiplication effect of super fine particles having a specific shape contained in the coating layer C and protrusions having a small height and a large width which have no adverse influence on the electromagnetic conversion characteristics. In addition, the laminate films of the present invention have extremely excellent wind-up property as a base film. On the other hand, the films which do not satisfy the requirements of the present invention do not achieve these characteristics at the same time.

TABLE 4

| | | Thermoplastic resin layer A | | | Thermoplastic resin layer B | | | | | |
|---|---|---|---|---|---|---|---|---|---|---|
| | | Contained particles | | | Particles having the largest average particle diameter | | | Other particles | | |
| | Type | Material of particles | Average particle diameter (nm) | Content (w %) | Material of particles | Average particle diameter (nm) | Content (wt %) | Material of particles | Average particle diameter (nm) | Content (wt %) |
| Ex. 10 | PET | — | — | — | crosslinked silicone resin | 0.6 | 0.05 | θ-alumina | 0.03 | 0.2 |
| Ex. 11 | PET | — | — | — | silica | 0.5 | 0.15 | silica | 0.08 | 0.2 |
| Ex. 12 | PET | — | — | — | silica | 0.6 | 0.10 | zirconia | 0.04 | 0.2 |
| Ex. 13 | PET | — | — | — | crosslinked silicone resin | 0.5 | 0.20 | θ-alumina | 0.03 | 0.3 |
| Ex. 14 | PEN | — | — | — | crosslinked silicone resin | 0.6 | 0.05 | silica | 0.08 | 0.2 |
| Ex. 15 | PEN | — | — | — | silica | 0.5 | 0.15 | θ-alumina | 0.03 | 0.2 |
| Ex. 16 | PEN | — | — | — | crosslinked silicone resin | 0.6 | 0.08 | silica | 0.08 | 0.2 |
| Ex. 17 | PEN | — | — | — | calcium carbonate | 0.3 | 0.30 | silica | 0.08 | 0.3 |
| Ex. 18 | PEN | — | — | — | crosslinked polystyrene | 0.5 | 0.10 | zirconia | 0.03 | 0.2 |
| Comp. Ex. 10 | PET | — | — | — | crosslinked silicone resin | 0.5 | 0.20 | silica | 0.08 | 0.2 |

TABLE 5

| | | Contained particles | | | Layer thickness | | |
|---|---|---|---|---|---|---|---|
| | Type of resin* | Material of particles | Volume shape factor | Average particle diameter (nm) | Density of particles (number/mm²) | Layer A (μm) | Layer B (μm) | Layer C (μm) |
| | | | | | | | | |

| | Type of resin* | Material of particles | Volume shape factor | Average particle diameter (nm) | Density of particles (number/mm²) | Layer A (μm) | Layer B (μm) | Layer C (μm) |
|---|---|---|---|---|---|---|---|---|
| Ex. 10 | A | silica | 0.5 | 16 | 13,000,000 | 5.5 | 0.8 | 4 |
| Ex. 11 | A | core-shell type organic particles | 0.4 | 30 | 10,000,000 | 8.6 | 1.2 | 5 |
| Ex. 12 | A | crosslinked silicone resin | 0.4 | 28 | 15,000,000 | 5.1 | 1.2 | 5 |
| Ex. 13 | A | acryl | 0.5 | 45 | 2,500,000 | 9.0 | 0.8 | 5 |
| Ex. 14 | B | silica | 0.5 | 24 | 9,000,000 | 4.2 | 1.0 | 4 |
| Ex. 15 | B | crosslinked silicone resin | 0.4 | 20 | 17,000,000 | 2.5 | 1.5 | 3 |
| Ex. 16 | B | core-shell type organic particles | 0.4 | 20 | 12,000,000 | 5.3 | 1.0 | 3 |
| Ex. 17 | B | silica | 0.5 | 28 | 6,000,000 | 4.0 | 0.6 | 4 |
| Ex. 18 | C | crosslinked silicone resin | 0.4 | 35 | 10,000,000 | 4.2 | 0.4 | 7 |

*Type of resin of coating layer C
A: acryl-modified polyester (SH551A of Takamatsu Yushi Co., Ltd.)
B: acryl-modified polyester (IN-170-6 of Takamatsu Yushi Co., Ltd.)
C: copolyester (2,6-naphthaienedicarboxylic acid/isophthalic acid/sodium 5-sulfoisophthalate//ethylene glycol/ addition product of 1 mole of bisphenol A with 2 moles of propylene oxide) = 90/5/5//70/30

TABLE 6

| | Surface characteristics of coating layer C | | | | Surface roughness | | | | | | |
|---|---|---|---|---|---|---|---|---|---|---|---|
| | Protrusions | | | protrusions | WR$_a$ | | | | Electromagnetic | | |
| | Height (nm) | Average width (μm) | Density (number/mm²) | AFM-Rz (nm) | Layer C (nm) | Layer B (nm) | $t_A/d_B$ | Wind-up property | conversion characteristics | Running durability | Still characteristics |
| Ex. 10 | 7 | 60 | 150 | 20 | 1.4 | 4.0 | 9.2 | ○ | ±0 | ◉ | ◉ |
| Ex. 11 | 6 | 80 | 90 | 25 | 1.2 | 4.5 | 17.2 | ○ | ±0 | ○ | ○ |
| Ex. 12 | 7 | 100 | 40 | 29 | 1.3 | 4.2 | 8.5 | ○ | +1.0 | ○ | ◉ |
| Ex. 13 | 6 | 60 | 120 | 50 | 1.7 | 4.8 | 18.0 | ◉ | ±0 | ○ | ○ |
| Ex. 14 | 6 | 85 | 60 | 30 | 1.2 | 4.0 | 7.0 | ○ | +1.0 | ◉ | ○ |
| Ex. 15 | 8 | 50 | 210 | 23 | 0.9 | 3.5 | 5.0 | ○ | +2.0 | ◉ | ◉ |
| Ex. 16 | 7 | 70 | 110 | 20 | 1.0 | 3.7 | 8.8 | ◉ | +1.5 | ○ | ◉ |
| Ex. 17 | 4 | 55 | 160 | 30 | 0.6 | 3.6 | 13.3 | ○ | +3.0 | ○ | ○ |
| Ex. 18 | 5 | 130 | 25 | 38 | 0.5 | 4.3 | 8.4 | ○ | +3.5 | ○ | ○ |

EXAMPLE 19

Dimethyl terephthalate and ethylene glycol were polymerized by adding manganese acetate as an ester exchange catalyst, antimony trioxide as a polymerization catalyst, phosphorous acid as a stabilizer and inert particles shown in Tables 7 and 8 as a lubricant in accordance with an usually used method to obtain polyethylene terephthalates (PET) for the layer A and the layer B (resin A and resin B) having an intrinsic viscosity of 0.60.

The resin A and the resin B were dried at 170° C. for 3 hours, supplied to two extruders, molten at a melting temperature of 280 to 300° C., laminated together through a multi-manifold coextrusion die in such a manner that the resin layer B was placed upon one side of the resin layer A, and quenched to obtain a 129 μm-thick unstretched laminate film.

The thus obtained unstretched film was preheated, stretched to 3.2 times between low-speed and high-speed rolls at a film temperature of 95° C., quenched, supplied to a stenter, and stretched in the transverse direction to 4.1 times at 110° C. The thus obtained biaxially oriented film was heat set with hot air at 220° C. for 4 seconds to obtain a 9.8 μm-thick biaxially oriented laminate polyester film. The thickness of each layer was adjusted by changing the discharge amounts of the two extruders. The Young's modulus of this film was 500 kg/mm² in the longitudinal direction and 700 kg/mm² in the transverse direction.

The surface characteristics, the ratio $t_A/d_B$ of the thickness $t_A$ of the smooth surface layer A to the average particle diameter $d_B$ of the largest particles out of the inert particles contained in the rough surface layer B and the wind-up property of this biaxially oriented laminate film and the characteristics of a thin ferromagnetic metal film deposited magnetic tape comprising this film are shown in Table 9.

EXAMPLES 20 AND 21

Biaxially oriented laminate polyester films were obtained in the same manner as in Example 19 except that the particles shown in Tables 7 and 8 were used and the thicknesses of the rough surface layer B and the smooth surface layer A were changed as shown in Tables 7 and 8. The characteristics of the thus obtained biaxially oriented laminate films and the characteristics of thin ferromagnetic metal film deposited magnetic tapes comprising these films are shown in Table 9.

EXAMPLES 22 TO 25

Polyethylene-2,6-naphthalates (PEN) (resins A and B) for the smooth surface layer A and the rough surface layer B were obtained in the same manner as in Example 19 except that the particles shown in Tables 7 and 8 were used and the same molar amount of 2,6-naphthalene dimethyl dicarboxylate was used in place of dimethyl terephthalate.

The resins A and B were dried at 170° C. for 6 hours and the thickness of each layer was adjusted in the same manner as in Example 19 to obtain unstretched laminate films of Examples 22 to 25.

The thus obtained unstretched films were preheated and stretched to 3.6 times between high-speed and low-speed rolls at a film temperature of 135° C., quenched, supplied to a stenter, and stretched in the transverse direction to 6.0 times at 155° C. The thus obtained biaxially oriented films were heat set with hot air at 200° C. for 4 seconds to obtain 4.8 $\mu$m-thick biaxially oriented laminate polyester films. The Young's moduli of these films were 560 kg/mm$^2$ in the longitudinal direction and 1,100 kg/mm$^2$ in the transverse direction. In Example 24, a film having a Young's modulus of 700 kg/mm$^2$ in the longitudinal direction and 730 kg/mm$^2$ in the transverse direction and a total thickness of 4.8 $\mu$m was obtained at stretch ratios of 4.85 (longitudinal direction)×5.0 (transverse direction) times. In Example 25, a film having a Young's modulus of 600 kg/mm$^2$ in the longitudinal direction and 900 kg/mm$^2$ in the transverse direction and a total thickness of 7.5 $\mu$m was obtained at stretch ratios of 4.0 (longitudinal direction)×5.0 (transverse direction) times. The characteristics of the thus obtained films and the characteristics of thin ferromagnetic metal film deposited magnetic tapes comprising these films are shown in Table 9.

As is evident from Table 9, the laminate films of the present invention have excellent scratch resistance and one extremely flat surface, exhibit excellent electromagnetic conversion characteristics, and enjoy both stable running property at a high temperature and a high humidity as a tape due to the effect of protrusions having a small height and a large width which have no adverse influence on the electromagnetic conversion characteristics and extremely excellent wind-up property as a base film due to the both effects of the protrusions and an opposite rough surface. On the other hand, the films of the prior art do not satisfy these four requirements at the same time.

TABLE 7

| | | Inert particles in rough surface layer B | | | | |
|---|---|---|---|---|---|---|
| | | Particles having the largest average particle diameter | | | Other particle | |
| | Thermoplastic resin | Type of particles | Average particle diameter ($\mu$m) | Content (wt %) | Type of particles | Average particle diameter ($\mu$m) | Content (wt %) |
| Ex. 19 | PET | silicon dioxide | 0.60 | 0.10 | θ-alumina | 0.03 | 0.3 |
| Ex. 20 | PET | silicone resin | 0.50 | 0.05 | silicon dioxide | 0.05 | 0.2 |
| Ex. 21 | PET | silicon dioxide | 0.60 | 0.10 | silicon dioxide | 0.05 | 0.2 |
| Ex. 22 | PEN | silicone resin | 0.50 | 0.05 | θ-alumina | 0.03 | 0.1 |
| Ex. 23 | PEN | silicon dioxide | 0.30 | 0.05 | silicon dioxide | 0.02 | 0.2 |
| Ex. 24 | PEN | silicone resin | 0.50 | 0.05 | silicon dioxide | 0.03 | 0.1 |
| Ex. 25 | PEN | silicon dioxide | 0.30 | 0.10 | θ-alumina | 0.03 | 0.3 |

TABLE 8

| | Inert fine particles in smooth surface layer A | | | | |
|---|---|---|---|---|---|
| | Type of particles | Average particle diameter (nm) | Content (wt %) | Layer thickness ($\mu$m) | |
| | | | | Layer B | Layer A |
| Ex. 19 | — | — | — | 1.30 | 8.50 |
| Ex. 20 | — | — | — | 0.60 | 6.70 |
| Ex. 21 | — | — | — | 0.50 | 5.90 |
| Ex. 22 | — | — | — | 0.70 | 4.10 |
| Ex. 23 | — | — | — | 1.80 | 3.00 |
| Ex. 24 | — | — | — | 0.70 | 4.10 |
| Ex. 25 | — | — | — | 0.50 | 7.00 |

(Note) "—" in the table indicates that the inert fine particles are not contained.

TABLE 9

| | Protrusion on layer A | | | | | |
|---|---|---|---|---|---|---|
| | Measurement direction (degree) | Height (nm) | Average width (μm) | Density (number/mm²) | Roughness [WR$_a$] (nm) | t$_A$/d$_B$ |
| Ex. 19 | 5 | 5 | 80 | 50 | 1.15 | 14.2 |
| Ex. 20 | 5 | 6 | 100 | 30 | 1.40 | 13.4 |
| Ex. 21 | 9 | 10 | 120 | 25 | 1.50 | 9.8 |
| Ex. 22 | 9 | 5 | 50 | 100 | 0.65 | 8.2 |
| Ex. 23 | 9 | 6 | 80 | 40 | 0.80 | 10.0 |
| Ex. 24 | 9 | 5 | 100 | 25 | 0.75 | 8.2 |
| Ex. 25 | 9 | 4 | 25 | 400 | 0.60 | 23.3 |

| | Roughness of layer B [WR$_a$] (nm) | Young's modulus of base film (kg/mm²) | | Wind-up property | Electromagnetic conversion characteristics C/N (λ = 0.5 μm) | Running property at high temperature and high humidity | Scratch resistance |
|---|---|---|---|---|---|---|---|
| | | MD | TD | | | | |
| Ex. 19 | 4.50 | 500 | 700 | ⊛ | +2 | ○ | ⊛ |
| Ex. 20 | 3.20 | 500 | 700 | ⊛ | +1 | ○ | ⊛ |
| Ex. 21 | 3.50 | 500 | 700 | ⊛ | ±0 | ○ | ⊛ |
| Ex. 22 | 2.80 | 560 | 1100 | ○ | +3 | ○ | ⊛ |
| Ex. 23 | 3.10 | 560 | 1100 | ○ | +2 | ○ | ⊛ |
| Ex. 24 | 3.20 | 700 | 730 | ○ | +1.5 | ○ | ⊛ |
| Ex. 25 | 2.50 | 600 | 900 | ○ | +3 | ○ | ⊛ |

EXAMPLE 26

Dimethyl terephthalate and ethylene glycol were polymerized by adding manganese acetate as an ester exchange catalyst, antimony trioxide as a polymerization catalyst, phosphorous acid as a stabilizer and inert particles shown in Tables 10 and 11 as a lubricant in accordance with an usually used method to obtain polyethylene terephthalates (PET) for the layer A and the layer B (resin A and resin B) having an intrinsic viscosity of 0.60.

The resin A and the resin B were dried at 170° C. for 3 hours, supplied to two extruders, molten at a melting temperature of 280 to 300° C., laminated together through a multi-manifold coextrusion die in such a manner that the resin layer B was placed upon one side of the resin layer A, and quenched to obtain a 129 μm-thick unstretched laminate film.

The thus obtained unstretched film was preheated, stretched to 3.2 times between low-speed and high-speed rolls at a film temperature of 95° C., quenched, supplied to a stenter, and stretched in the transverse direction to 4.1 times at 110° C. The thus obtained biaxially oriented film was heat set with hot air at 220° C. for 4 seconds to obtain a 9.8 μm-thick biaxially oriented laminate polyester film. The thickness of each layer was adjusted by changing the discharge amounts of the two extruders. The Young's modulus of this film was 500 kg/mm² in the longitudinal direction and 700 kg/mm² in the transverse direction.

The surface characteristics, the ratio t$_A$/d$_B$ of the thickness t$_A$ of the smooth surface layer A to the average particle diameter d$_B$ of the largest particles out of the inert particles contained in the rough surface layer B and the wind-up property of this biaxially oriented laminate film and the characteristics of a thin ferromagnetic metal film deposited magnetic tape comprising this film are shown in Table 12.

EXAMPLES 27 AND 28

Biaxially oriented laminate polyester films were obtained in the same manner as in Example 26 except that the particles shown in Table 10 were used and the thicknesses of the rough surface layer B and the smooth surface layer A were changed as shown in Tables 10 and 11. The characteristics of the thus obtained films and the characteristics of thin ferromagnetic metal film deposited magnetic tapes comprising these films are shown in Table 12.

EXAMPLES 29 TO 32

Polyethylene-2,6-naphthalates (PEN) (resins A and B) for the smooth surface layer A and the rough surface layer B were obtained in the same manner as in Example 26 except that the particles shown in Table 10 were used and the same molar amount of 2,6-naphthalene dimethyl dicarboxylate was used in place of dimethyl terephthalate.

The resins A and B were dried at 170° C. for 6 hours and the thickness of each layer was adjusted in the same manner as in Example 26 to obtain unstretched laminate films.

The thus obtained unstretched films were preheated, stretched to 3.6 times between low-speed and high-speed rolls at a film temperature of 135° C., quenched, supplied to a stenter, and stretched in the transverse direction to 6.0 times at 155° C. The thus obtained biaxially oriented films were heat set with hot air at 200° C. for 4 seconds to obtain 4.6 μm-thick biaxially oriented laminate polyester films.

The Young's moduli of these films were 650 kg/mm² in the longitudinal direction and 1,100 kg/mm² in the transverse direction. The film of Example 31 had a longitudinal stretch ratio of 4.85 and a transverse stretch ratio of 5.0 and a total thickness of 5.9 μm and the film of Example 32 had a longitudinal stretch ratio of 4.0 and a transverse stretch ratio of 5.0 and a total thickness of 7.5 μm. The biaxially oriented laminate polyester film of Example 31 had a Young's modulus of 700 kg/mm² in the longitudinal direction and 730 kg/mm² in the transverse direction and that of Example 32 had a Young's modulus of 600 kg/mm² in the longitudinal direction and 900 kg/mm² in the transverse direction. The surface characteristics of these films and the characteristics of thin ferromagnetic metal film deposited magnetic tapes comprising these films are shown in Table 12.

As is evident from Table 12, the laminate films of the present invention have excellent scratch resistance and one extremely flat surface, exhibit excellent electromagnetic conversion characteristics, and enjoy both stable running property at a high temperature and a high humidity as a tape due to the effect of extremely small protrusions formed on the surface and protrusions having a small height and a large width which have no adverse influence on the electromagnetic conversion characteristics and extremely excellent wind-up property as a base film due to the both effects of the wide protrusions and an opposite rough surface. On the other hand, the films of comparative examples do not satisfy these four requirements at the same time.

the surface not in contact with the thermoplastic resin layer B, of the thermoplastic resin layer A has protrusions having an average height of 2 to 85 nm and an average width of 20 to 500 $\mu$m, at a density of 4 to 2,500/mm$^2$, and having a center plane average roughness $^A$WR$_a$ of not more than 10 nm; and the thermoplastic resin layer B contains inert fine particles and the surface not in contact with the thermoplastic resin layer A, of the thermoplastic resin layer B is rougher than the surface not in contact with the thermoplastic resin layer B, of the thermoplastic resin layer A.

2. The biaxially oriented laminate film of claim 1, wherein the thermoplastic resin layer A contains inert fine particles A having an average particle diameter of 40 to 400 nm and a volume shape factor of 0.1 to $\pi$/6.

3. The biaxially oriented laminate film of claim 2, wherein the surface of the thermoplastic resin layer A. has protrusions ascribed to the inert fine particles A at a density of 5,000 to 50,000/mm$^2$.

TABLE 10

| | | Inert fine particles in rough surface layer B | | | | |
|---|---|---|---|---|---|---|
| | | Particle having the largest average particle diameter | | | Other particle | |
| | Thermoplastic resin | Type of particles | Average particle diameter ($\mu$m) | Content (wt %) | Type of particles | Average particle diameter ($\mu$m) | Content (wt %) |
| Ex. 26 | PET | silicone resin | 0.6 | 0.05 | θ-alumina | 0.03 | 0.2 |
| Ex. 27 | PET | silicon dioxide | 0.6 | 0.05 | θ-alumina | 0.03 | 0.2 |
| Ex. 28 | PET | silicone resin | 0.5 | 0.1 | silicon dioxide | 0.05 | 0.2 |
| Ex. 29 | PEN | silicone resin | 0.5 | 0.02 | silicon dioxide | 0.05 | 0.2 |
| Ex. 30 | PEN | silicon dioxide | 0.3 | 0.1 | silicon dioxide | 0.03 | 0.3 |
| Ex. 31 | PEN | silicon dioxide | 0.5 | 0.05 | silicon dioxide | 0.05 | 0.2 |
| Ex. 32 | PEN | silicone resin | 0.6 | 0.1 | θ-alumina | 0.03 | 0.2 |

TABLE 11

| | Inert fine particles in smooth surface layer A | | | | Layer thickness ($\mu$m) | |
|---|---|---|---|---|---|---|
| | Type of particles | Average particle diameter (nm) | Volume shape factor (f) | Density of particles on film surface (number/mm$^2$) | Layer B | Layer A |
| Ex. 26 | silicone resin | 100 | 0.5 | 25,000 | 0.8 | 9.00 |
| Ex. 27 | calcium carbonate | 120 | 0.4 | 30,000 | 0.6 | 6.70 |
| Ex. 28 | silicon dioxide | 60 | 0.5 | 10,000 | 0.8 | 5.60 |
| Ex. 29 | silicon dioxide | 60 | 0.5 | 12,000 | 0.8 | 3.80 |
| Ex. 30 | silicon dioxide | 50 | 0.5 | 10,000 | 2.00 | 2.60 |
| Ex. 31 | silicone resin | 60 | 0.5 | 9,000 | 0.90 | 3.70 |
| Ex. 32 | silicon dioxide | 50 | 0.5 | 10,000 | 2.00 | 5.50 |

TABLE 12

| | Protrusions on layer A | | | | Roughness of layer B [WR$_a$] | Young's modulus of base film (kg/mm$^2$) | | Wind-up property | Electromagnetic conversion characteristics C/N ($\lambda$ = 0.5 $\mu$m) | Running property at high temperature and high humidity | Scratch resistance |
|---|---|---|---|---|---|---|---|---|---|---|---|
| | Measurement direction (degree) | Height (nm) | Average width ($\mu$m) | Roughness [WR$_a$] (nm) | | | | | | | |
| | | | | | t$_A$/d$_B$ | (nm) | MD | TD | | | | |
| Ex. 26 | 5 | 4 | 150 | 1.8 | 15 | 4.6 | 500 | 700 | ⊛ | ±0 | ○ | ⊛ |
| Ex. 27 | 5 | 4 | 100 | 1.5 | 11.2 | 4.2 | 500 | 700 | ⊛ | ±0 | ○ | ⊛ |
| Ex. 28 | 9 | 5 | 50 | 0.9 | 11.2 | 2.9 | 500 | 700 | ⊛ | +3 | ○ | ⊛ |
| Ex. 29 | 9 | 5 | 50 | 0.7 | 7.6 | 2.5 | 560 | 1100 | ○ | +3 | ○ | ⊛ |
| Ex. 30 | 9 | 5 | 25 | 0.6 | 8.7 | 2.8 | 560 | 1100 | ○ | +3.5 | ○ | ⊛ |
| Ex. 31 | 9 | 5 | 25 | 0.5 | 7.4 | 5 | 700 | 730 | ⊛ | +3 | ○ | ⊛ |
| Ex. 32 | 9 | 4 | 100 | 0.5 | 9.2 | 4.6 | 600 | 900 | ⊛ | +3 | ○ | ⊛ |

What is claimed is:

1. A biaxially oriented laminate film comprising a thermoplastic resin layer A and a thermoplastic resin layer B which is laminated on one side of the thermoplastic resin layer A, wherein 4. The biaxially oriented laminate film of claim 1, wherein the thermoplastic resin layer A does not substantially contain inert fine particles having an average particle diameter of not less than 40 nm.

5. The biaxially oriented laminate film of claim 1, wherein the inert fine particles contained in the thermoplastic resin layer B are first particles having a particle size distribution of a relative standard deviation of not more than 0.5 or second particles which comprise the first particles and other particles, the average particle diameter of the first particles being largest in the second particles, and the thickness of the thermoplastic resin layer A and the average particle diameter of the inert fine particles satisfy the following expression (1):

$$4 \leq t_A/d_B \leq 40 \tag{1}$$

wherein $t_A$ is a thickness ($\mu$m) of the thermoplastic resin layer A and $d_B$ is an average particle diameter ($\mu$m) of the first particles when the inert fine particles consist of the first particles only or the largest average particle diameter ($\mu$m) of the first particles when the inert fine particles consist of the second particles.

6. The biaxially oriented laminate film of claim 5, wherein the average particle diameter of the first particles or the largest average particle diameter of the first particles contained in the second particles is 0.2 to 1 $\mu$m.

7. The biaxially oriented laminate film of claim 5 or 6, wherein the content of the first particles is 0.001 to 5.0% by weight.

8. The biaxially oriented laminate film of claim 1, wherein the surface not in contact with the thermoplastic resin layer A, of the thermoplastic resin layer B has a center plane average roughness $^B\text{WR}_a$ of 2 nm or more but less than 15 nm.

9. The biaxially oriented laminate film of claim 1, wherein the thickness of the thermoplastic resin layer A is at least 0.8 $\mu$m and the thickness of the thermoplastic resin layer B is at least ½ of the average particle diameter $d_B$ defined as in claim 5 of the inert particles contained in the thermoplastic resin layer B.

10. The biaxially oriented laminate film of claim 1 which has a thickness of 2.5 to 20 $\mu$m.

11. The biaxially oriented laminate film of claim 1, wherein the thermoplastic resins constituting the thermoplastic resin layer A and the thermoplastic resin layer B are the same or different aromatic polyester(s).

12. The biaxially oriented laminate film of claim 11, wherein the aromatic polyester is polyethylene terephthalate or polyethylene-2,6-naphthalene dicarboxylate.

13. A magnetic recording medium comprising the biaxially oriented laminate film of claim 1 and a magnetic recording layer laminated on the surface not in contact with the thermoplastic resin layer B, of the thermoplastic resin layer A.

14. The magnetic recording medium of claim 13, wherein the magnetic recording layer is a thin deposited-metal layer.

15. The magnetic recording medium of claim 13, wherein the magnetic recording layer is a coated magnetic recording layer having a thickness of 1 $\mu$m at most.

16. The magnetic recording medium of claim 13, which is of a digital signal recording.

17. A biaxially oriented laminate film comprising a thermoplastic resin layer C, a thermoplastic resin layer A and a thermoplastic resin layer B which are laminated in the order named, wherein the surface not in contact with the thermoplastic resin layer A, of the thermoplastic resin layer C has protrusions having an average height of 2 to 85 nm and an average width of 20 to 500 $\mu$m, at a density of 4 to 2,500/mm²; and the thermoplastic resin layer B contains inert fine particles and the surface not in contact with the thermoplastic resin layer A, of the thermoplastic resin layer B is rougher than the surface not in contact with the thermoplastic resin layer A, of the thermoplastic resin layer C.

18. The biaxially oriented laminate film of claim 17, wherein the thermoplastic resin layer C contains inert fine particles C having an average particle diameter of 10 to 50 nm and a volume shape factor of 0.1 to $\pi/6$.

19. The biaxially oriented laminate film of claim 17, wherein the surface of the thermoplastic resin layer C has protrusions having an average height which is 30 to 200% of the average particle diameter of the inert fine particles C, at a density of 2 to 50/$\mu$m².

20. The biaxially oriented laminate film of claim 17, wherein the thermoplastic resin layer A contains inert fine particles A having an average particle diameter of 40 to 400 nm and a volume shape factor of 0.1 to $\pi/6$.

21. p1 The biaxially oriented laminate film of claim 17, wherein the thermoplastic resin layer A does not substantially contain inert fine particles having an average particle diameter of not less than 40 nm.

22. The biaxially oriented laminate film of claim 17, wherein the inert fine particles contained in the thermoplastic resin layer B are first particles having a particle size distribution of a relative standard deviation of not more than 0.5 or second particles which comprise the first particles and other particles, the average particle diameter of the first particles being largest in the second particles, and the thickness of the thermoplastic resin layer A and the average particle diameter of the inert fine particles satisfy the following expression (1):

$$4 \leq t_A/d_B \leq 40 \tag{1}$$

wherein $t_A$ is a thickness ($\mu$m) of the thermoplastic resin layer A and $d_B$ is an average particle diameter ($\mu$m) of the first particles when the inert fine particles consist of the first particles only or the largest average particle diameter ($\mu$m) of the first particles when the inert fine particles consist of the second particles.

23. The biaxially oriented laminate film of claim 22, wherein the average particle diameter of the first particles or the largest average particle diameter of the first particles contained in the second particles is 0.2 to 1 $\mu$m.

24. The biaxially oriented laminate film of claim 22 or 23, wherein the content of the first particles is 0.001 to 5.0 t by weight.

25. The biaxially oriented laminate film of claim 17, wherein the surface not in contact with the thermoplastic resin layer A, of the thermoplastic resin layer C has a center plane average roughness $^C\text{WR}_a$ of not more than 10 nm.

26. The biaxially oriented laminate film of claim 17, wherein the surface not in contact with the thermoplastic resin layer A, of the thermoplastic resin layer B has a center plane average roughness $^B\text{WR}_a$ of 2 nm or more but less than 15 nm.

27. The biaxially oriented laminate film of claim 17, wherein the thermoplastic resin layer C is stretched monoaxially or biaxially.

28. The biaxially oriented laminate film of claim 17, wherein the thickness of the thermoplastic resin layer A is at least 0.8 $\mu$m and the thickness of the thermoplastic resin layer B is at least ½ of the average particle diameter $d_B$ defined as in claim 22 of the inert particles contained in the thermoplastic resin layer B.

29. The biaxially oriented laminate film of claim 17, which has a thickness of 2.5 to 20 μm.

30. The biaxially oriented laminate film of claim 17, wherein the thermoplastic resins constituting the thermoplastic resin layer A and the thermoplastic resin layer B are the same or different aromatic polyesters.

31. The biaxially oriented laminate film of claim 30, wherein the aromatic polyester is polyethylene terephthalate or polyethylene-2,6-naphthalene dicarboxylate.

32. A magnetic recording medium comprising the biaxially oriented laminate film of claim 17 and a magnetic recording layer laminated on the surface not in contact with the thermoplastic resin layer A, of the thermoplastic resin layer C.

33. The magnetic recording medium of claim 32, wherein the magnetic recording layer is a thin deposited-metal layer.

34. The magnetic recording medium of claim 32, wherein the magnetic recording layer is a coated magnetic recording layer having a thickness of 1 μm at most.

35. The magnetic recording medium of claim 32, which is of a digital signal recording.

36. A process for preparation of a magnetic recording medium which comprises using the biaxially oriented laminate film of claim 1 as a base film for the magnetic recording medium.

37. A process for preparation of a magnetic recording medium which comprises using the biaxially oriented laminate film of claim 17 as a base film for the magnetic recording medium.

* * * * *